US012768512B2

(12) United States Patent
Massa et al.

(10) Patent No.: US 12,768,512 B2
(45) Date of Patent: Oct. 20, 2026

(54) HIGH CONSPICUITY MULTI-AXIS LIGHTING FOR EMERGENCY AND UTILITY VEHICLES

(71) Applicant: HiViz Lighting, Inc., Hendersonville, NC (US)

(72) Inventors: Samuel T. Massa, Hendersonville, NC (US); Britain Heaphy, Denver, CO (US); Jesse Whitaker McRae, Hendersonville, NC (US)

(73) Assignee: HiViz Lighting, Inc., Hendersonville, NC (US)

( * ) Notice: Subject to any disclaimer, the term of this patent is extended or adjusted under 35 U.S.C. 154(b) by 29 days.

(21) Appl. No.: 18/641,932

(22) Filed: Apr. 22, 2024

(65) Prior Publication Data

US 2025/0327555 A1 Oct. 23, 2025

(51) Int. Cl.

| | |
|---|---|
| ***F21S 43/14*** | (2018.01) |
| ***B60Q 1/50*** | (2006.01) |
| ***F21S 43/30*** | (2018.01) |
| ***F21W 103/10*** | (2018.01) |

(52) U.S. Cl.

CPC ................ *F21S 43/14* (2018.01); *B60Q 1/50* (2013.01); *F21S 43/30* (2018.01); *F21W 2103/10* (2018.01)

(58) Field of Classification Search

CPC ........................................................ B60Q 1/52

See application file for complete search history.

(56) References Cited

U.S. PATENT DOCUMENTS

| | | | | |
|---|---|---|---|---|
| 2012/0119899 | A1* | 5/2012 | McLoughlin ............ | B60Q 1/46 340/469 |
| 2017/0074493 | A1* | 3/2017 | Feng ........................ | F21S 43/27 |
| 2017/0350573 | A1* | 12/2017 | Fleszewski ............. | F21V 7/041 |
| 2017/0365136 | A1* | 12/2017 | Torre Sarmiento ... | F21V 21/096 |

* cited by examiner

*Primary Examiner* — Eric T Eide

(74) *Attorney, Agent, or Firm* — CHRISTENSEN O'CONNOR JOHNSON KINDNESS PLLC

(57) ABSTRACT

A warning light, including a point source configured to emit a front light, and one or more side firing light sources, where the first side firing light source and the second side firing light source are configured to emit one or more side lights at an angle substantially perpendicular to the front light, and where the one or more side lights are configured to illuminate an emergency vehicle. Further, a system including two or more warning lights as described herein, an emergency vehicle, and a processor configured to communicatively couple the two or more warning lights.

20 Claims, 10 Drawing Sheets

HIGH CONSPICUITY MULTI-AXIS LIGHTING FOR EMERGENCY AND UTILITY VEHICLES

BACKGROUND

Fire apparatus, ambulances, and police cars are often referred to as "emergency vehicles". Tow trucks, power company vehicles, repair trucks, construction equipment and other service vehicles are often referred to as utility vehicles. One of the leading contributors to injury for the operators of these vehicles while working on the roadway is becoming involved in an auto accident while working on the side of the roadway.

Emergency and utility vehicles are often equipped with lighting technologies known as "warning" "hazard" or "emergency" lighting, referred to as warning lights herein. Some vehicles have a single warning light beacon on the roof, some have multiple perimeter lights around the perimeter of the vehicles, some have a warning lightbar on the roof which lights up in all directions. Some vehicles have combinations of fixtures. Generally, the fixtures that make up warning light systems are designed to flash, or to rotate.

The color of the warning light indicates to oncoming motorists what the function the vehicle serves (for instance, it is common that blue indicates law enforcement activity, red indicates fire or EMS, and yellow indicates utility/tow/construction. Flashing white to the front often indicates the vehicle is requesting right-of-way).

Traditionally the lights in a warning system include halogen bulbs which flash on and off or halogen bulbs which with a rotating reflector orbiting the lamp. In the halogen flashing lamp designs, the nature of the halogen lamp causes the light to gradually increase from darkness to brightness as the filament heats up and emits light. In the rotating configuration, the lamp is always "on" but as the reflector orbits the lamp, it causes a concentrated beam of light to shine in the eyes of passersby in a gradually increasing and decreasing intensity as it got closer and eventually passed their vantage point (much like a lighthouse). Almost all legacy fixtures incorporate some sort of tinted or colored plastic or glass lens which the light passed through. By nature of passing through the translucent material, the lens diffused some of the light and produced some resonant glow similar to a nearly transparent lampshade.

As technology has evolved, the source type has predominantly transitioned from halogen lamps to light-emitting diodes (LEDs). One benefit of LEDs is the ability to have an "instant on" flash of light that is much more analogous to a square wave than the traditional sinusoidal waveform a halogen lamp produced when it cycled from off to on and back off again. Additionally, the transition to LEDs has shrunk the source size from that of a lightbulb, to diodes which are sometimes no larger than the head of a pen. This reduction in source size, coupled with highly pure/clear advanced acrylic, silicone, or other optical systems has increased the intensity of the beam significantly and reduced the lampshade effect disrobed above.

However, even with LEDs, many motorists passing stopped emergency vehicles report that the perception of their warning lights at night is that they are so bright that they have diminished ability to see the vehicle itself. They also report that they cannot see past the fixtures to visualize the responders working near the parked vehicle while they are flashing. Passing motorists eyes are adjusted to the ambient light level, and the intensity of light relative to the aperture in the motorist's eye is too great. While this is not an issue during the daytime, this can cause serious safety concerns at night.

Accordingly, warning lights for night-time use that do not impede passing motorist's ability to see emergency vehicles, and to reduce the "blinding" effect are needed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, disclosed herein is a warning light, including a point source configured to emit a front light, and one or more side firing light sources, where the one or more side firing light sources are configured to emit one or more side lights at an angle substantially perpendicular to the front light, and where the one or more side lights are configured to illuminate an emergency vehicle.

In some embodiments, the point source is comprised of one or more light emitting diodes (LEDs). In some embodiments, the one or more side firing light sources are a first side firing light source disposed on a first side of the point source, and the second side firing light source is disposed on a second side opposite the first side of the point source. In some embodiments, the one or more side firing light sources are a first side firing light source disposed on a top side of the point source, and the second firing light source is disposed on a bottom side opposite the top side of the point source. In some embodiments, the one or more side firing light sources are disposed 360 degrees around the point source.

In some embodiments, each side firing light source of the one or more side firing light sources comprises a reflective plate configured to direct the one or more side lights onto the emergency vehicle. In some embodiments, the reflective plate has an angle of greater than 180 degrees towards the emergency vehicle. In some embodiments, a printed circuit board (PCB) including the side firing light sources is angled sideways (or towards the emergency vehicle) so that the light source themselves face sideways (or towards the emergency vehicle).

In some embodiments, the point source is communicatively coupled to a first circuit and the one or more side firing light sources are communicatively coupled to a second circuit, such that the point source is configured to be turned on and off independently of the one or more side firing light sources.

In some embodiments, the one or more side firing light sources are configured to turn off while the emergency vehicle is in motion and turn on when the emergency vehicle is stationary. In some embodiments, the one or more side firing light sources are configured to emit the one or more side lights in a flashing pattern. In some embodiments, the one or more side firing light sources are configured to emit the one or more side lights in a white color, red color, green color, blue color, purple color, orange color, or a combination thereof.

In some embodiments, the point source is configured to emit the front light in a flashing pattern. In some embodiments, the point source is configured to emit the front light in a white color, red color, green color, blue color, purple color, orange color, or a combination thereof.

In another aspect, disclosed herein is a system including two or more warning lights as described herein, an emergency vehicle, and a processor configured to communicatively couple the two or more warning lights.

In some embodiments, the two or more warning lights are configured to turn on and off together. In some embodiments, the two or more warning lights are configured to turn on and off independently.

In some embodiments, each warning light of the two or more warning lights are configured to emit a flashing pattern from the point source, the one or more side firing light sources, or both.

In some embodiments, the one or more side firing light sources of each warning light is configured to turn off when the emergency vehicle is in motion. In some embodiments, the one or more side firing light sources of each warning light is configured to turn on when the emergency vehicle is stationary.

In some embodiments, the point source of each warning light is configured to turn off when the emergency vehicle is stationary.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

Disclosed herein are warning lights configured to be used at night that do not conceal emergency vehicles from passing motorists. The warning lights disclosed herein may reduce or eliminate the "blinding" effect on passing motorists and allow motorists to view emergency vehicles at night without or with less discomfort.

When designing these warning lights, after experimentation it was determined that the root cause of this issue may be less about the intensity of the beam, and more about the intensity of the beam contrasted against the absence of light surrounding the vehicle at night. The inventors have observed that shining high output scene lights on the emergency vehicle and responders makes the vehicles more conspicuous and reduces the number of complaints about beam intensity because the overall scene light level is more consistent. When a high intensity point source of light is shone in the eyes of motorists in the absence of ambient light, motorists complain. When a high intensity point source is flooded with other ambient light (daylight or artificially) complaints are significantly reduced.

Figure 1A:
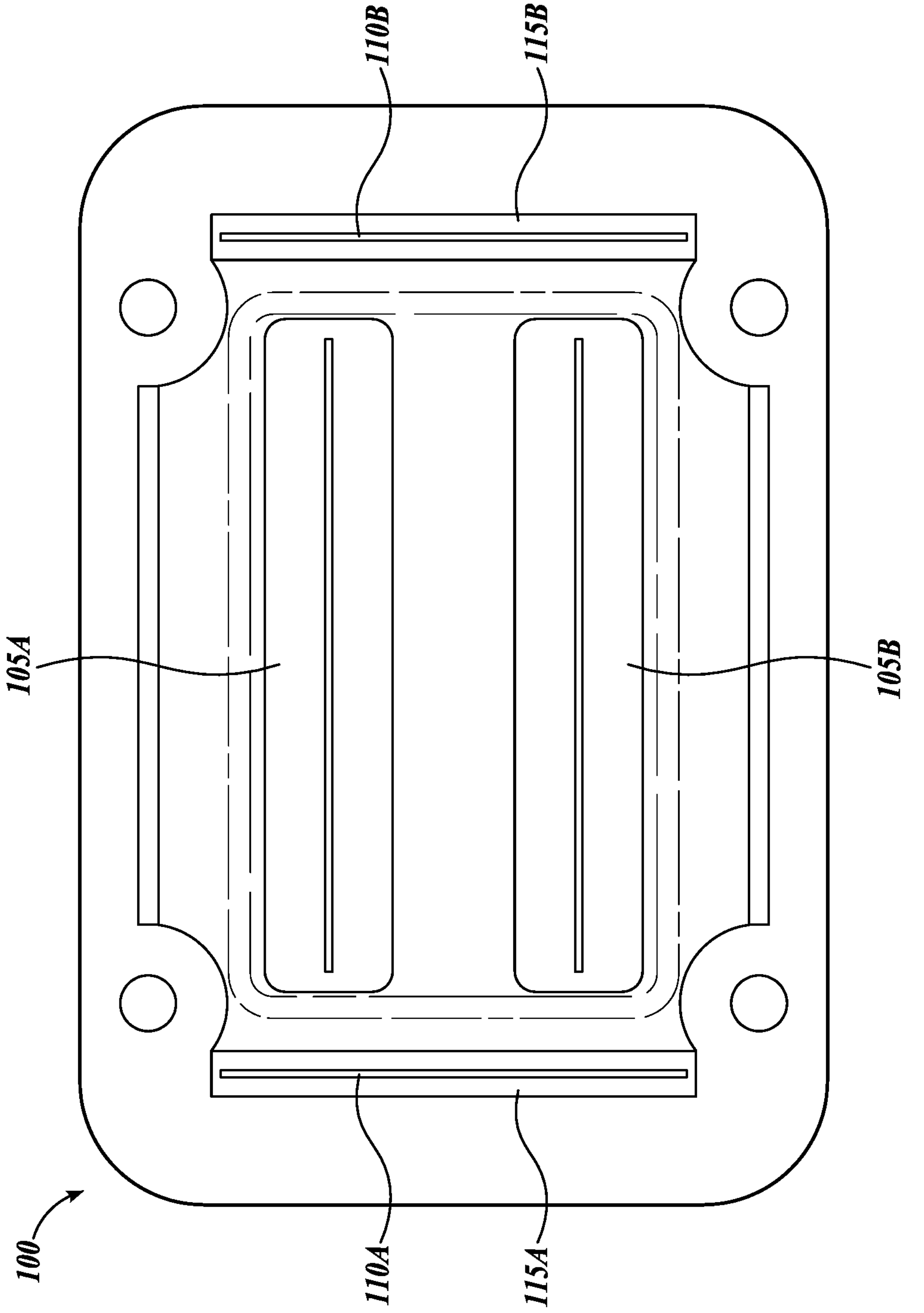
FIG. 1A is an example front side view of a warning light, in accordance with the present technology.
Figure 1C:
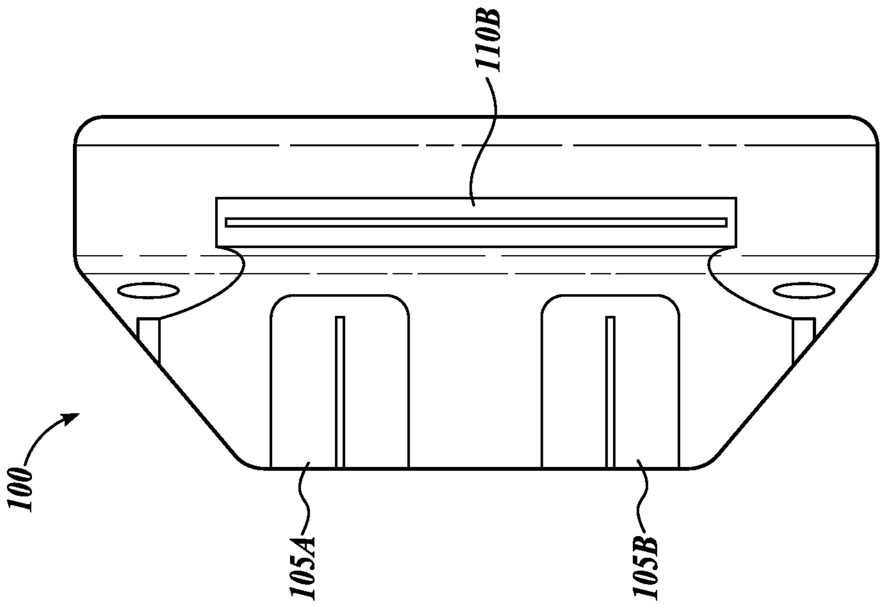
FIG. 1C is an example left side view of a warning light, in accordance with the present technology.
Figure 1B:
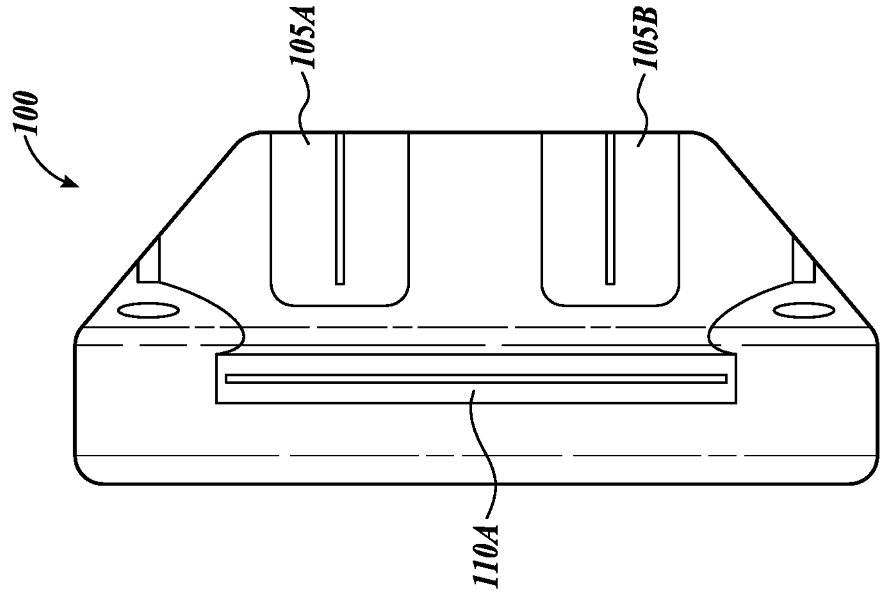
FIG. 1B is an example right side view of a warning light, in accordance with the present technology.

FIG. 1A is an example front side view of a warning light 100, in accordance with the present technology. FIG. 1B is an example right side view of a warning light, in accordance with the present technology. FIG. 1C is an example left side view of a warning light, in accordance with the present technology. In some embodiments, disclosed herein is a warning light 100 including a point source 105A, 105B configured to emit a front light (such as FL in FIGS. 2A, 2B, 3B, and 4B), and one or more side firing light sources 110A, 110B, where the one or more side firing light sources 105A, 105B are configured to emit one or more side lights (such as side lights SL1, SL2 in FIGS. 2A, 2C, 3B, and 4B) at an angle substantially perpendicular to the front light, where the one or more side lights 110A, 110B are configured to illuminate an emergency vehicle (such as emergency vehicle 1000 in FIG. 5). In some embodiments, the one or more side firing light sources 110A, 110B are a first side firing light source 110A disposed on a first side of the point source 105A, 105B, and the second side firing light source 110B is disposed on a second side opposite the first side of the point source 105A, 105B.

In some embodiments, the warning light 100 includes a point source 105A, 105B, one or more side-firing light sources 110A, 110B, and reflective plates 115A, 115B. In some embodiments, the point source 105A, 105B is one or more LEDs that shine outward from an emergency vehicle. The side-firing light sources 110A, 110B may also be LEDs which face perpendicular to the point source 105A, 105B, rearward towards the emergency vehicle, or otherwise in a direction intended to illuminate the vehicle or the scene.

The point source 105A, 105B may include a first LED 105A and a second LED 105B. One skilled in the art should understand any number of LEDs may be included in the point source 105A, 150B. The point source 105A, 105B shines in the eyes of traffic, while the side firing light sources 110A, 110B shine down the sides of the emergency vehicle illuminating the vehicle and creating a gradual effect which increases ambient light levels and improves overall visibility. This effect is similar to RGB backlights for TVs which reduce strain on the eyes of TV watchers at night.

The point source 105A, 105B and the side-firing light sources 110A, 110B can be controlled with one or more circuits. In some embodiments, the side-firing light sources 110A, 110B can operate independently or together with the primary optic (point source 105A, 105B). In some instances, the point source 105A, 105B may be turned completely off and only the side firing light sources 110A, 110B are used, such as shown in FIG. 2C.

In some embodiments, the warning light 100 further includes reflective plates 115A, 115B placed atop the side-firing light sources 110A, 110B on a circuit board. These reflective plates 115A, 115B redirect light onto the emergency vehicle. In some embodiments, the reflective plates 115A, 115B are angled more than 180 degrees towards the emergency vehicle, maximizing the reflective property of lighting the emergency vehicle as opposed to outwards towards passing motorists.

In some embodiments, separate circuit boards are placed on the sides of a aligned with the side-firing light sources 110A, 110B. In some embodiments, the side-firing light sources 110A, 110B are optical assemblies that shine light outward and on to the emergency vehicle. In some embodiments, the circuits don't share a common housing but in others they do. In some embodiments, two or more warning lights may be wired and synchronized together to shine light outward and onto the emergency vehicle. In such embodiments, the two or more warning lights may be separate or share common housing. In some embodiments, the two or more warning lights may share optical assemblies or have independent optical assemblies. As used herein, "optical assemblies" include total internal reflection (TIR) optics, reflector optics, and the like.

Figure 2A:
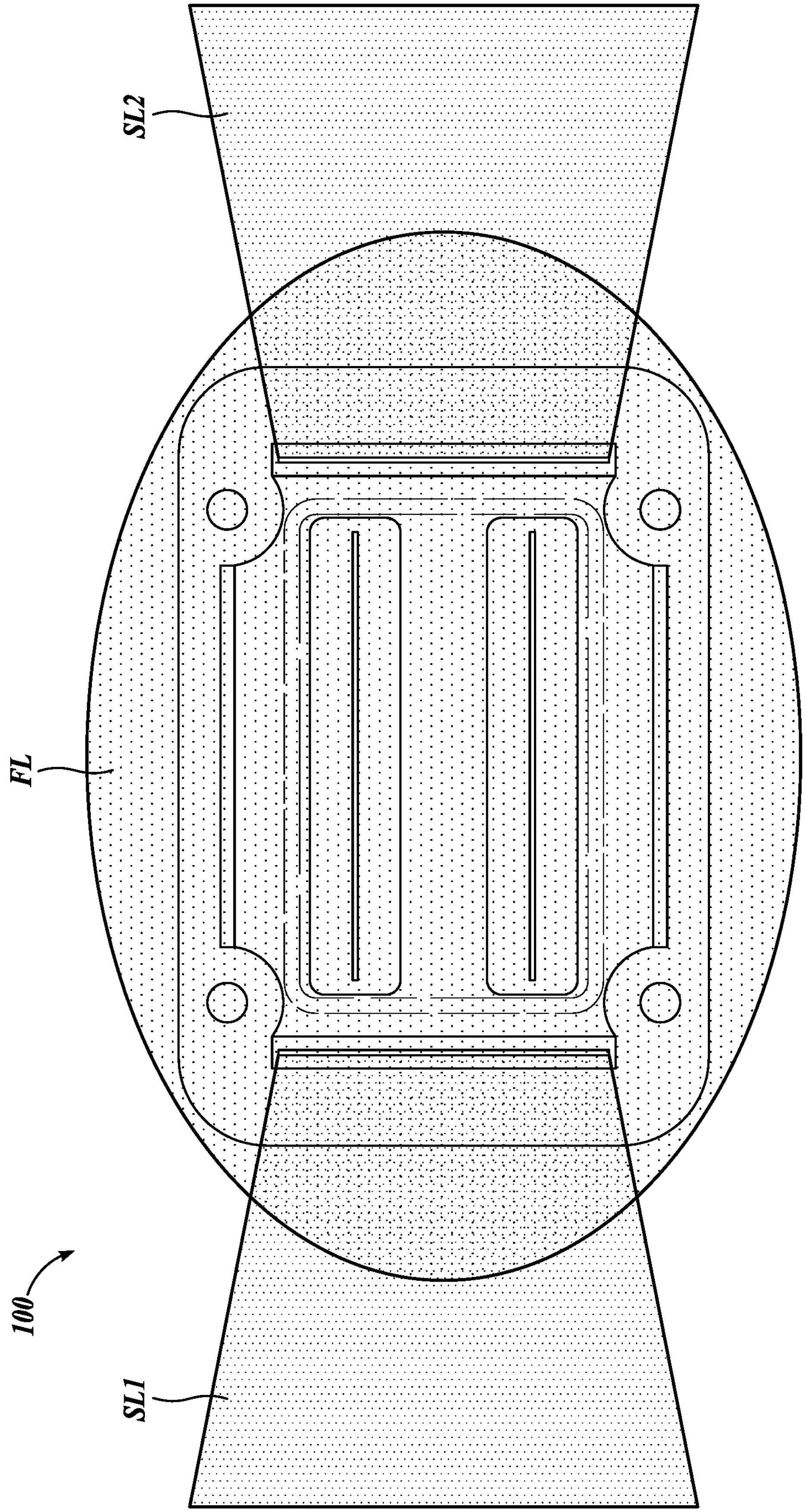
FIG. 2A is example light emitted by a warning light, in accordance with the present technology.

FIG. 2A is example light emitted by a warning light 100, in accordance with the present technology. In some embodiments, the front, rear, top, and bottom and "outward" facing (primary) light sources (105A, 105B, 110A, 110B in FIGS. 1A-1C) may all have a distinct circuit, or may share circuits (such as having one circuit for the point source and one circuit for the side-firing light sources). The circuits may be selectively turned ON and OFF to improve conspicuity, and/or suit a particular need or situation. When turned on, the point source, the side-firing light sources, or both may emit a solid light, a flashing light, a pulsing light, or the like. The front light FL, the first side light SL1, and the second side light SL2 may be any color of light.

For example, in FIG. 2A, both the point source and the side-firing light sources are turned on. The point source emits a front light FL. The side firing light sources emit a first side light SL1 and a second side light SL2. In some embodiments, the first side light SL1 and the second side light SL2 illuminate a side of an emergency vehicle, which improves the conspicuousness of the vehicle and also makes the front light FL appear less bright to oncoming traffic.

In some embodiments, if the emergency vehicle is parked off-axis (such as across a lane of traffic on a roadway), the side firing light source give a wider than 180 degree viewing angle which can mean a high intensity light beam faces traffic even if the point source is shining the front light FL 45-degrees across the roadway.

Figure 2B:
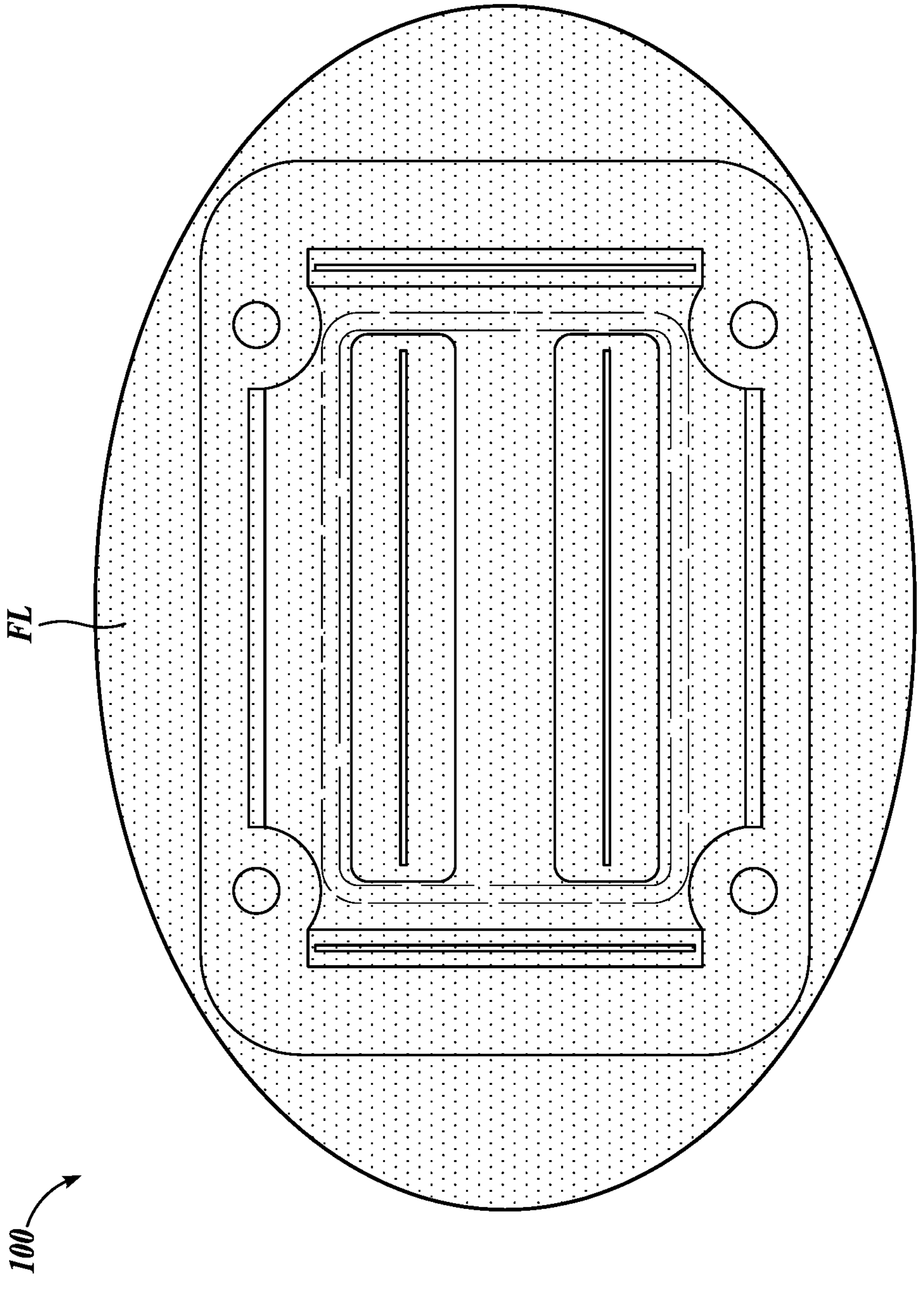
FIG. 2B is another example light emitted by a warning light, in accordance with the present technology.
Figure 2C:
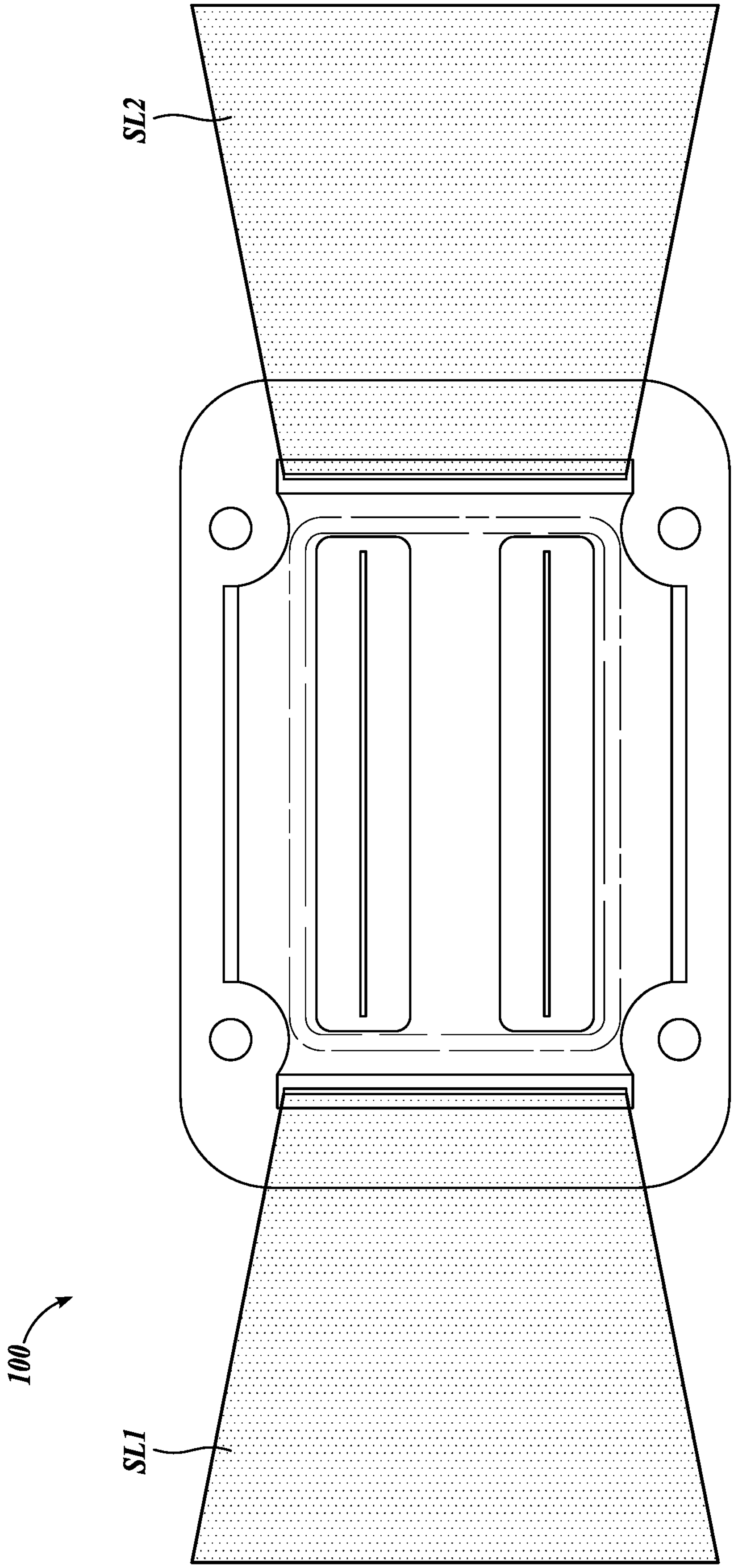
FIG. 2C is yet another example light emitted by a warning light, in accordance with the present technology.

FIG. 2B is another example light emitted by a warning light 100, in accordance with the present technology. In some embodiments, the side firing LEDs may be turned on/off depending on the use case or mode the vehicle is in. For example, while responding to a call, the emergency vehicle may not want the side firing LEDs on the side of the vehicle turned "on" because they would be flashing light directly in the side and rear-view mirrors of the fire apparatus. Accordingly, the side-firing LEDs may be turned off while responding and when on-scene. FIG. 2B shows only the front light FL being emitted from the warning light 100.

FIG. 2C is yet another example light emitted by a warning light 100, in accordance with the present technology. In some embodiments, only the side firing light sources are turned on, so only the first side light SL1 and the second side light SL2 are enabled. In some embodiments, this may be done to illuminate the vehicle without shining light into the eyes or the direction of passing motorists.

Figure 3A:
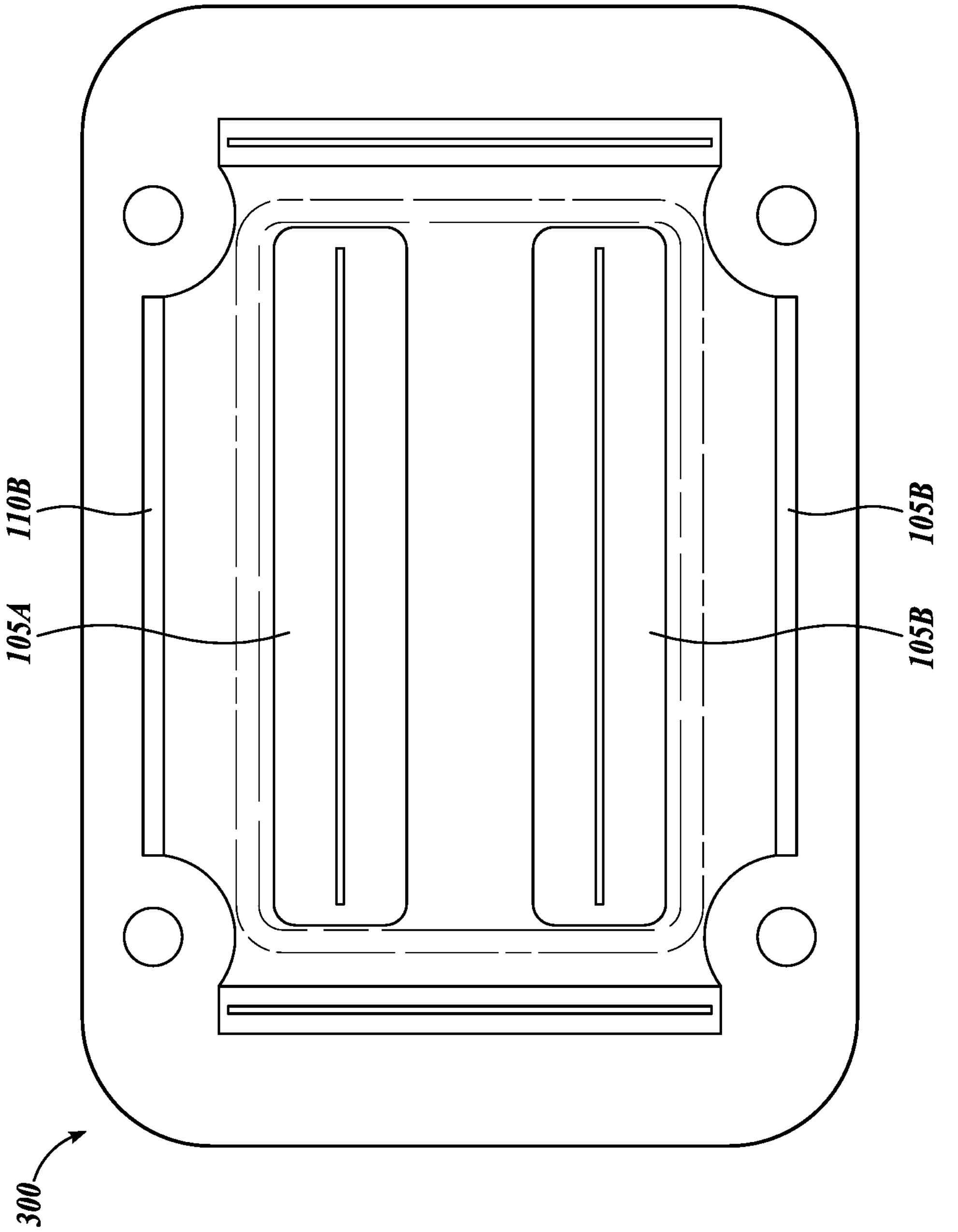
FIG. 3A is another example front side view of a warning light, in accordance with the present technology.

FIG. 3A is another example front side view of a warning light 300, in accordance with the present technology. In some embodiments, the side-firing light sources 110A, 110B may be located on a top and bottom of the point source 105A, 105B. In some embodiments, the one or more side firing light sources 110A, 110B are a first side firing light source 110A disposed on a top side of the point source 105A, 105B, and the second firing light source 110B is disposed on a bottom side opposite the top side of the point source 105A, 105B. In some embodiments, warning light 300 also includes the reflective plates disclosed herein.

Figure 3B:
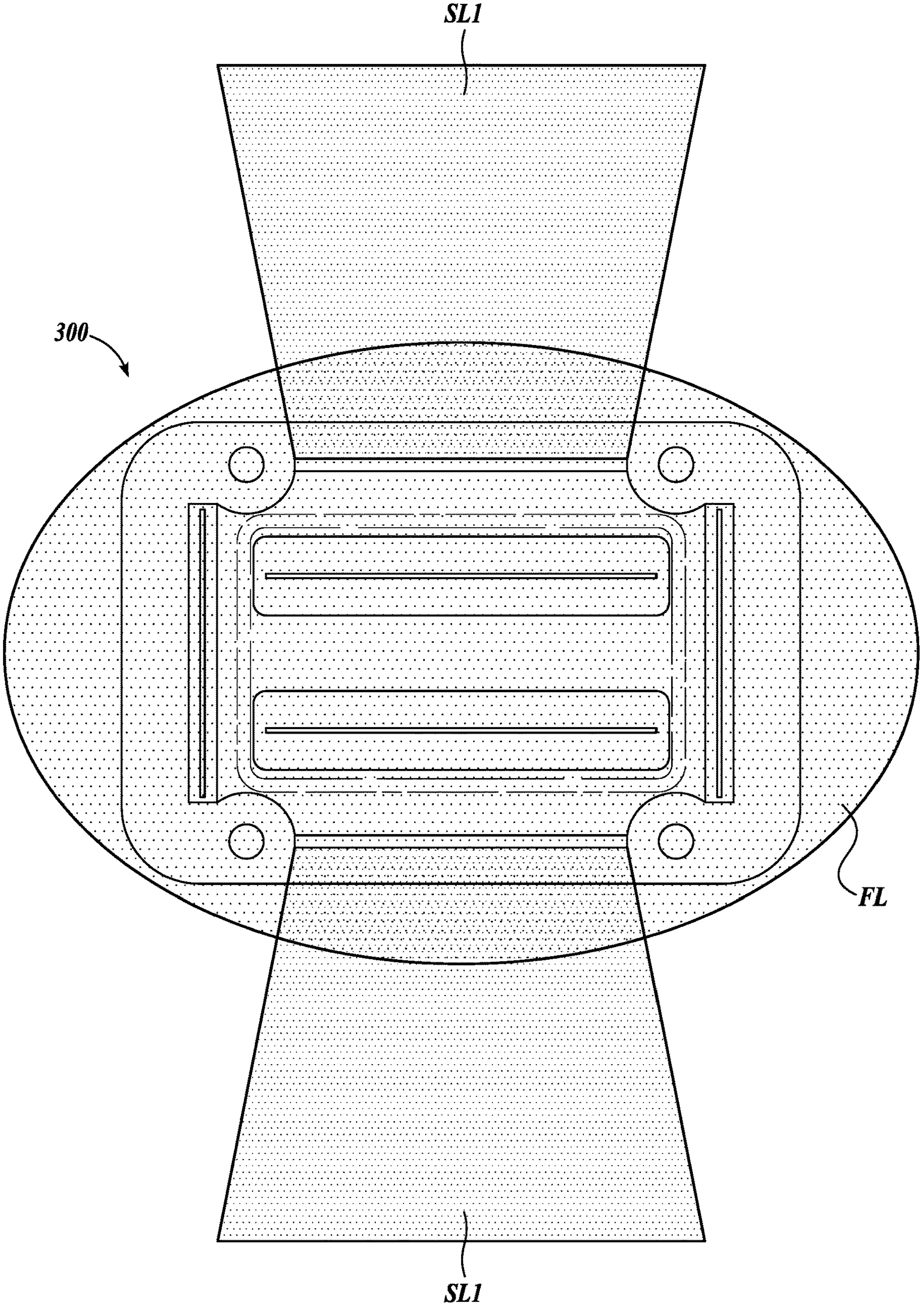
FIG. 3B is example light emitted by the warning light of FIG. 3A, in accordance with the present technology.

FIG. 3B is example light emitted by the warning light 300 of FIG. 3A, in accordance with the present technology. While the front light FL and the first side light SL1 and second side light SL2 are shown, it should be understood that warning light 300 may turn on only the point source or the side firing light sources, as desired. The side-firing light sources can fire in any and all directions circumferentially surrounding the fixture. In some embodiments, such as shown in FIGS. 3A-3B, the side-firing light sources 110A, 110B can be up/down firing light sources.

Figure 4A:
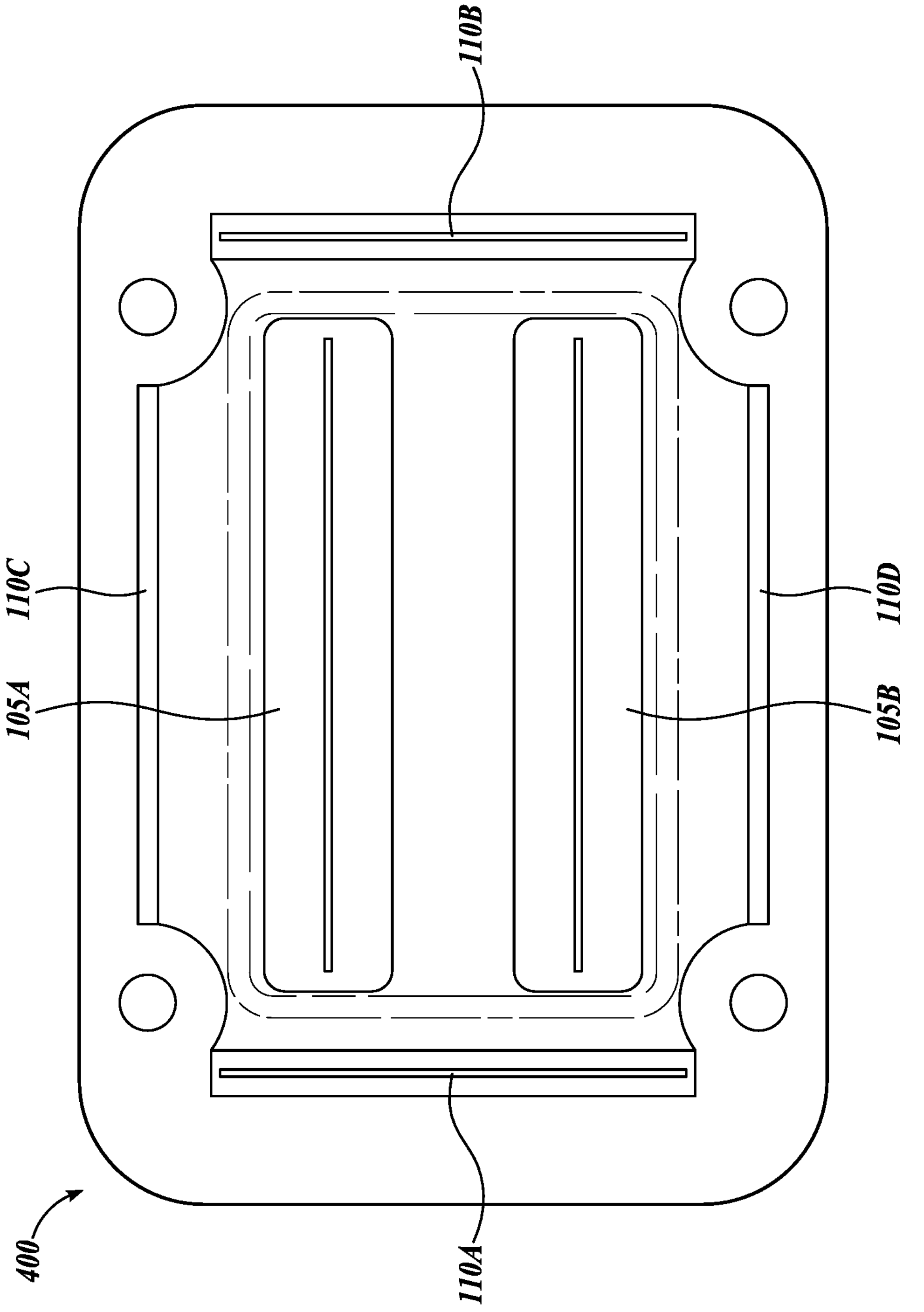
FIG. 4A is another example front side view of a warning light, in accordance with the present technology.

FIG. 4A is another example front side view of a warning light 400, in accordance with the present technology. In some embodiments, the side-firing light sources 110A, 110B, 110C, 110D are 360-degree firing lights. In some embodiments, the one or more side firing light sources 110A, 110B, 110C, 110D disposed 360 degrees around the point source 105A, 105B. While four side firing light sources 110A, 110B, 110C, 110D are illustrated, any number of side firing light sources may make up the 360-degree firing lights, including one, such as a 360-degree firing light made up of a single strip of LEDs. In some embodiments, warning light 400 also includes the reflective plates disclosed herein. While a rectangular warning light 400 is illustrated, in some embodiments, the warning light may be cylindrical (a "beacon" light). In such embodiments, the point source 105 is circular, while the side firing lights are located around the circular light source cylindrically.

Figure 4B:
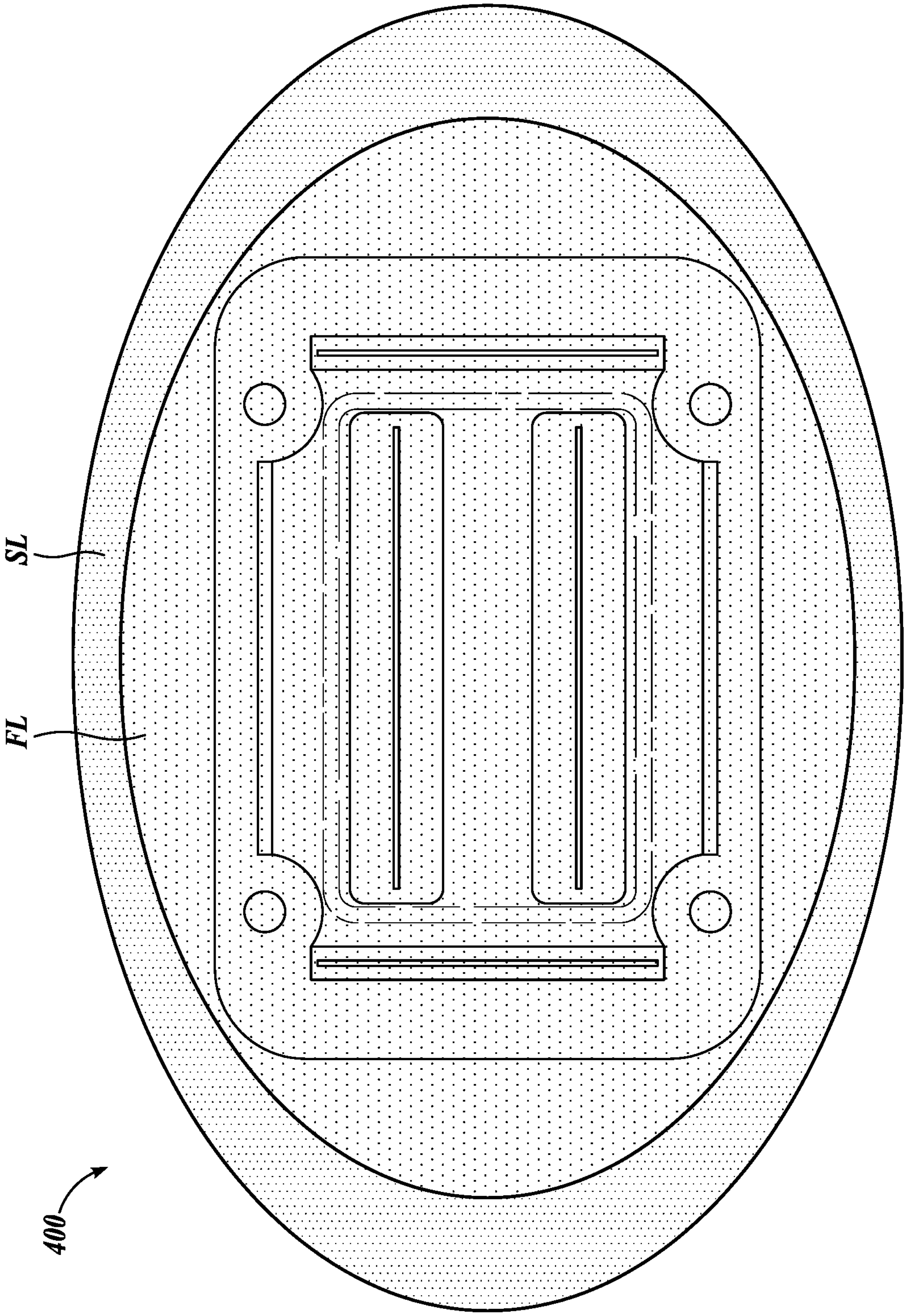
FIG. 4B is example light emitted by the warning light of FIG. 3A, in accordance with the present technology.

FIG. 4B is example light emitted by the warning light 400 of FIG. 3A, in accordance with the present technology. In some embodiments, the 360-degree firing lights can emit a side light SL around the warning light 400 in all directions. While the front light FL and the side light SL are shown, it should be understood that warning light 400 may turn on only the point source or the side firing light sources, as desired.

Figure 5:
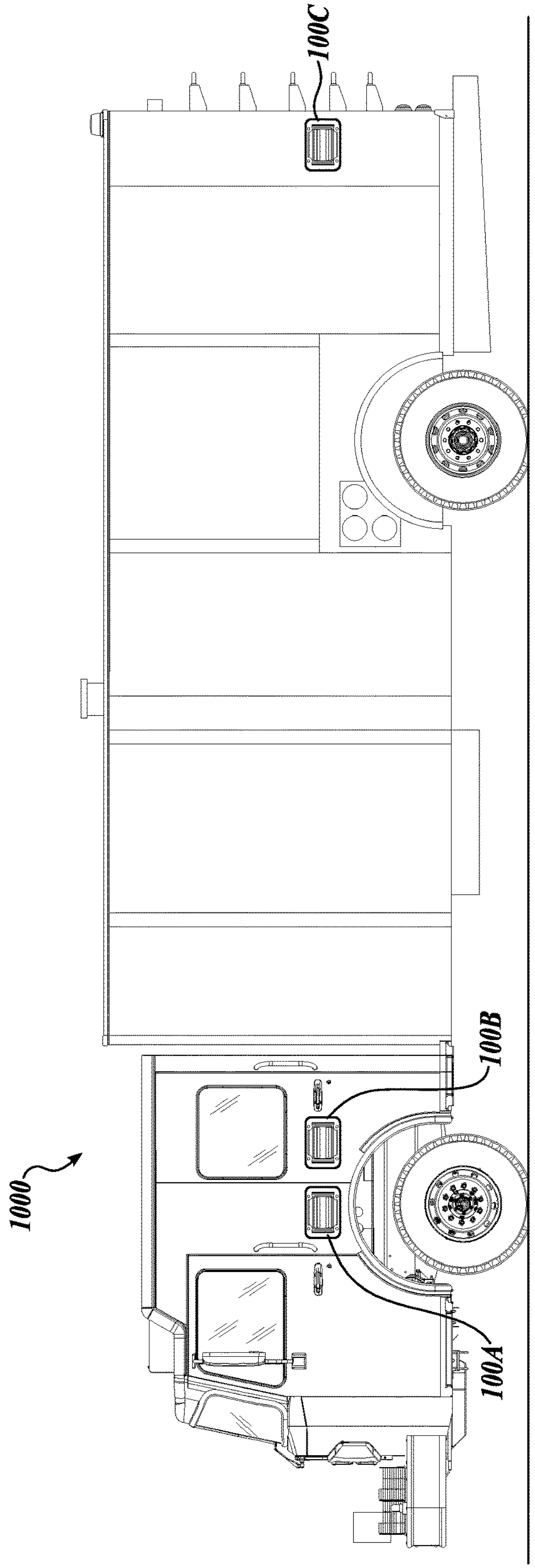
FIG. 5 is example warning lights located on an emergency vehicle, in accordance with the present technology.

FIG. 5 shows example warning lights 100A, 100B, 100C located on an emergency vehicle 1000, in accordance with the present technology. In some embodiments, the warning lights described herein (such as warning lights 100, 300, 400) may be attached to an emergency vehicle 1000. It should be understood that FIG. 5 is not necessarily to scale.

In some embodiments, the emergency vehicle 1000 is a firetruck, but in other embodiments, the emergency vehicle is an ambulance, police car, emergency services boat, a plane, or the like.

In some embodiments, the warning lights 100A, 100B, 100C are attached to the emergency vehicle 1000 in a variety of locations, such as on a front side cabin of the emergency vehicle 1000 (such as 100A, 100B) and on a side near the back of the emergency vehicle 1000 (such as 100C). In some embodiments, the warning lights 100A, 100B, 100C may also be located on the front or the back of the emergency vehicle 1000. While three warning lights 100A, 100B, 100C are illustrated, it should be understood that any number of warning lights 100A, 100B, 100C may be attached to the emergency vehicle.

In some embodiments, the two or more warning lights 100A, 100B, 100C are configured to turn on and off together. In some embodiments, the two or more warning lights 100A, 100B, 100C are configured to turn on and off independently.

In some embodiments, each warning light 100A, 100B, 100C of the two or more warning lights are configured to emit a flashing pattern from the point source (such as point source 105A, 105B), the one or more side firing light sources (such as side firing light sources 110A, 110B), or both. In some embodiments, the one or more side firing light sources of each warning light 100A, 100B, 100C is configured to turn off when the emergency vehicle is in motion. In some embodiments, the one or more side firing light sources 100A, 100B, 100C of each warning light is configured to turn on when the emergency vehicle is stationary. In some embodiments, the point source of each warning light is configured to turn off when the emergency vehicle is stationary.

The present application may reference quantities and numbers. Unless specifically stated, such quantities and numbers are not to be considered restrictive, but representative of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Embodiments disclosed herein may utilize circuitry in order to implement technologies and methodologies described herein, operatively connect two or more components, generate information, determine operation conditions, control an appliance, device, or method, and/or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

An embodiment includes one or more data stores that, for example, store instructions or data. Non-limiting examples of one or more data stores include volatile memory (e.g., Random Access memory (RAM), Dynamic Random Access memory (DRAM), or the like), non-volatile memory (e.g., Read-Only memory (ROM), Electrically Erasable Programmable Read-Only memory (EEPROM), Compact Disc Read-Only memory (CD-ROM), or the like), persistent memory, or the like. Further non-limiting examples of one or more data stores include Erasable Programmable Read-Only memory (EPROM), flash memory, or the like. The one or more data stores can be connected to, for example, one or more computing devices by one or more instructions, data, or power buses.

In an embodiment, circuitry includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

We claim:

1. A vehicle-mounted warning light for an emergency vehicle, comprising:

a point source configured to emit a front light configured to emit light towards oncoming traffic; and one or more side firing light sources mounted within a same housing as the point source, wherein one or more side firing light sources are oriented inward toward exterior surfaces of the emergency vehicle, wherein the one or more side lights are configured to illuminate an emergency vehicle body to increase ambient luminance of the vehicle and reduce glare of the front light.

2. The warning light of claim 1, wherein the point source is comprised of one or more light emitting diodes (LEDs).

3. The warning light of claim 1, wherein the one or more side firing light sources comprise a first side firing light source disposed on a first lateral side of the point source, and a second side firing light source is disposed on a second lateral side opposite the first lateral side of the point source.

4. The warning light of claim 1, wherein the one or more side firing light sources are a first side firing light source disposed on a top side of the point source, and a second firing light source is disposed on a bottom side opposite the top side of the point source.

5. The warning light of claim 1, wherein the one or more side firing light sources comprise a reflective or optical element configured to emit 360 degrees of light toward the exterior surfaces of the emergency vehicle and away from oncoming traffic.

6. The warning light of claim 1, wherein each side firing light source of the one or more side firing light sources comprises a reflective plate configured to direct the one or more side lights onto the emergency vehicle.

7. The warning light of claim 6, wherein the reflective plate has an angle of greater than 180 degrees towards the emergency vehicle.

8. The warning light of claim 1, wherein the point source is communicatively coupled to a first circuit and the one or more side firing light sources are communicatively coupled to a second circuit, such that the point source is operable independently of the one or more side firing light sources.

9. The warning light of claim 1, wherein the one or more side firing light sources are configured to turn off while the emergency vehicle is in motion and turn on when the emergency vehicle is stationary.

10. The warning light of claim 1, wherein the one or more side firing light sources are configured to emit the one or more side lights in a flashing pattern.

11. The warning light of claim 1, wherein the one or more side firing light sources are configured to emit the one or more side lights in a white color, red color, green color, blue color, purple color, orange color, or a combination thereof.

12. The warning light of claim 1, wherein the point source is configured to emit the front light in a flashing pattern.

13. The warning light of claim 1, wherein the point source is configured to emit the front light in a white color, red color, green color, blue color, purple color, orange color, or a combination thereof.

14. A system comprising:

two or more warning lights according to any one of claim 1;

an emergency vehicle; and a vehicle controller (processor) coupled to the two or more warning lights, wherein the vehicle controller is configured for coordination an operation of the front light and the one or more side firing light sources of each of the two or more warning lights.

15. The system of claim 14, wherein the two or more warning lights are configured to turn on and off together.

16. The system of claim 14, wherein the two or more warning lights are configured to turn on and off independently.

17. The system of claim 14, wherein each warning light of the two or more warning lights are configured to emit a flashing pattern from the point source, the one or more side firing light sources, or both.

18. The system of claim 14, wherein the vehicle controller is configured to turn off the one or more side firing light sources of each warning light while the emergency vehicle is in motion.

19. The system of claim 14, wherein the vehicle controller is configured to turn on the one or more side firing light sources of each warning light when the emergency vehicle is stationary.

20. The system of claim 14, wherein the vehicle controller is configured to turn off point source of each warning light when the emergency vehicle is stationary, while maintaining illumination of the emergency vehicle with the one or more side firing light sources.

* * * * *